United States Patent
Brooker

(10) Patent No.: US 10,701,176 B1
(45) Date of Patent: Jun. 30, 2020

(54) MESSAGING USING A HASH RING WITH HOST GROUPS

(71) Applicant: Amazon Technologies, Inc., Seattle, WA (US)

(72) Inventor: Marc John Brooker, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 487 days.

(21) Appl. No.: 15/275,024

(22) Filed: Sep. 23, 2016

(51) Int. Cl.
H04L 29/08 (2006.01)
H04L 29/06 (2006.01)

(52) U.S. Cl.
CPC .......... H04L 67/32 (2013.01); H04L 67/1002 (2013.01)

(58) Field of Classification Search
CPC ............................ H04L 67/32; H04L 67/1002
USPC ......................................................... 709/217
See application file for complete search history.

(56) References Cited

U.S. PATENT DOCUMENTS

| | | | | |
|---|---|---|---|---|
| 7,260,623 B2 * | 8/2007 | Wookey | .............. | H04L 63/0428 370/465 |
| 7,904,592 B2 * | 3/2011 | Norton | .................. | H04L 51/063 370/312 |
| 8,849,825 B1 * | 9/2014 | McHugh | ............. | G06F 16/1873 707/737 |
| 9,747,319 B2 * | 8/2017 | Bestler | ................ | G06F 16/2255 |
| 2002/0029285 A1 * | 3/2002 | Collins | ................ | G06F 3/1454 709/232 |
| 2002/0156931 A1 * | 10/2002 | Riedel | .................... | H04L 29/06 719/313 |
| 2003/0020621 A1 * | 1/2003 | Kessler | ................ | H04L 63/164 340/635 |
| 2003/0182464 A1 * | 9/2003 | Hamilton | ............... | G06F 9/546 719/314 |
| 2004/0064512 A1 * | 4/2004 | Arora | ..................... | H04L 51/04 709/206 |
| 2004/0064568 A1 * | 4/2004 | Arora | ..................... | H04L 29/06 709/228 |
| 2004/0064693 A1 * | 4/2004 | Pabla | ..................... | H04L 63/02 713/168 |

(Continued)

OTHER PUBLICATIONS

"Reliable Storage and Querying for Collaborative Data Sharing Systems" Nicholas E. Taylor and Zachary G. Ives Computer and Information Science Department, University of Pennsylvania Philadelphia, PA, U.S.A. (Year: 2010).*

*Primary Examiner* — David R Lazaro
*Assistant Examiner* — Berhanu Shitayewoldetadik
(74) *Attorney, Agent, or Firm* — Thorpe North & Western, LLP

(57) ABSTRACT

Technology is described for interacting with messages in a message queue. A message request may be received for a message queue in a service provider environment. The message queue may store messages in a hash ring of host groups, and a host group in the hash ring may include one or more individual hosts. A message identifier associated with the message request may be identified. The message identifier may include a hash identifier and a hash configuration version number, and the hash configuration version number may correspond to a current configuration of the hash ring of host groups. The message request may be performed with respect to the hash identifier and the hash configuration version number that identifies the hash ring of host groups.

19 Claims, 9 Drawing Sheets

(56) References Cited

U.S. PATENT DOCUMENTS

| | | | | |
|---|---|---|---|---|
| 2004/0139148 | A1* | 7/2004 | Norton | H04L 51/063 709/200 |
| 2004/0193830 | A1* | 9/2004 | Haren | G06F 12/10 711/202 |
| 2005/0027788 | A1* | 2/2005 | Koopmans | H04L 67/32 709/200 |
| 2005/0237948 | A1* | 10/2005 | Wan | H04L 29/06 370/254 |
| 2005/0238040 | A1* | 10/2005 | Vitebsky | H04L 29/06 370/431 |
| 2006/0031605 | A1* | 2/2006 | Kao | G06F 3/0605 710/23 |
| 2007/0282915 | A1* | 12/2007 | Vosshall | G06F 16/2365 |
| 2009/0132761 | A1* | 5/2009 | Yim | G06F 3/0613 711/114 |
| 2009/0210586 | A1* | 8/2009 | Tanabe | H04L 45/745 710/52 |
| 2009/0307302 | A1* | 12/2009 | Tennant | G06F 16/172 709/203 |
| 2010/0296397 | A1* | 11/2010 | Fraccalvieri | H04L 41/14 370/230.1 |
| 2011/0184920 | A1* | 7/2011 | Vosshall | G06F 16/2365 707/690 |
| 2011/0197059 | A1* | 8/2011 | Klein | H04L 9/083 713/155 |
| 2011/0231524 | A1* | 9/2011 | Lin | G06F 3/0635 709/220 |
| 2012/0042065 | A1* | 2/2012 | Takahashi | G06F 3/1203 709/224 |
| 2012/0198004 | A1* | 8/2012 | Watte | H04L 51/043 709/206 |
| 2013/0024875 | A1* | 1/2013 | Wang | G06F 13/22 719/318 |
| 2013/0036427 | A1* | 2/2013 | Chen | G06F 9/546 719/312 |
| 2013/0073691 | A1* | 3/2013 | Quan | H04L 67/06 709/219 |
| 2013/0159395 | A1* | 6/2013 | Backholm | H04L 43/065 709/203 |
| 2013/0159525 | A1* | 6/2013 | Koike | H04L 67/32 709/225 |
| 2013/0170348 | A1* | 7/2013 | Luna | H04L 47/20 370/230.1 |
| 2013/0170397 | A1* | 7/2013 | Tamura | H04L 41/0233 370/254 |
| 2014/0075030 | A1* | 3/2014 | Wang | H04L 43/08 709/226 |
| 2014/0172944 | A1* | 6/2014 | Newton | H04L 41/0893 709/202 |
| 2015/0019680 | A1* | 1/2015 | Darcy | H04L 67/1097 709/214 |
| 2015/0058749 | A1* | 2/2015 | Hwu | H04L 67/18 715/753 |
| 2016/0055143 | A1* | 2/2016 | Goel | G06F 17/277 715/229 |
| 2016/0057226 | A1* | 2/2016 | Bestler | G06F 11/1076 709/217 |
| 2016/0142296 | A1* | 5/2016 | Parsa | H04L 45/46 370/392 |
| 2016/0191380 | A1* | 6/2016 | De | H04L 45/74 370/338 |
| 2016/0191509 | A1* | 6/2016 | Bestler | G06F 16/2255 713/163 |
| 2016/0219089 | A1* | 7/2016 | Murthy | H04L 65/4076 |
| 2016/0366109 | A1* | 12/2016 | Lablans | G06F 5/012 |
| 2017/0006132 | A1* | 1/2017 | Sorenson, III | H04L 67/32 |
| 2017/0142129 | A1* | 5/2017 | Peng | H04L 47/72 |
| 2017/0230449 | A1* | 8/2017 | Krishna | H04L 67/104 |
| 2017/0317935 | A1* | 11/2017 | Murthy | G06F 15/17 |
| 2018/0152516 | A1* | 5/2018 | Bestler | G06F 11/1076 |

* cited by examiner

MESSAGING USING A HASH RING WITH HOST GROUPS

BACKGROUND

Customers may execute various components (e.g., program code, threads, or processes) in a service provider environment hosted by a service provider. The components may be launched within or uploaded to the service provider environment, and the components may be executed when triggered by an occurrence of a predefined event. The components may send, receive and/or delete messages from a message queue maintained by a messaging service.

The message queue may be a repository that stores messages for the components executing in the service provider environment. The message queue may store messages that are waiting to be processed by other components executing in the service provider environment. In addition, the messaging service may function as a broker that provides a software and/or hardware infrastructure to support the sending and receiving of messages between components executing in the service provider environment.

The messaging service may provide a reliable, fail-safe and scalable hosted message queue, and the implementation of the message queue may result in various advantages. For example, the message queue may be redundantly stored across multiple geographic regions in the service provider environment to increase robustness. The message queue may provide message storage when components are busy or unavailable. In addition, the message queue may enable multiple components to simultaneously send and/or receive messages.

DETAILED DESCRIPTION

Figure 1:
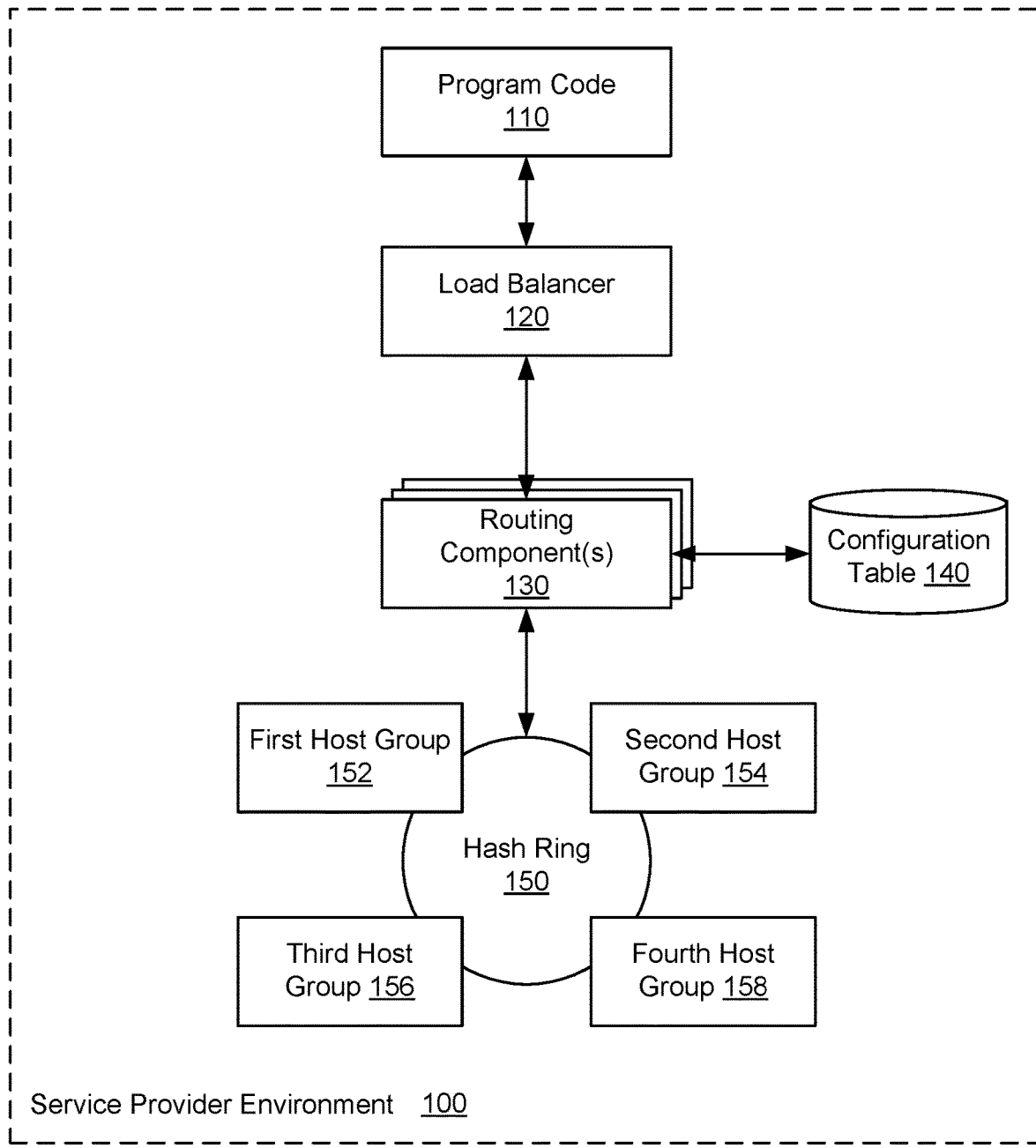
FIG. 1 illustrates a system and related operations for storing and retrieving messages from a hash ring with host groups according to an example of the present technology.

A technology is described for a message queue in a service provider environment. The message queue may store messages in a hash ring with a plurality of host groups. Each host group may include one or more individual hosts, and the individual hosts may be located in different geographic regions. The hosts may include physical hosts or virtualized hosts. The message queue may be operated by a messaging service, and the message queue may function as a broker to support the communication of messages between clients (e.g., applications, components, program codes, threads, processes, clients, devices, etc.) that are executing in the service provider environment. As examples, a first client may send a message request to store a message in the message queue, a second client may send a message request to retrieve a message from the message queue for consumption, and/or the second client may send a message request to delete a message stored on the message queue.

In one example, a message request may be received from a client. The message request may be received at a routing component, or router, operating in the service provider environment, and the routing component may function to route the message request to an appropriate entity. The message request may include a request to store a message into the message queue (i.e., a push operation), a request to retrieve a message from the message queue (i.e., a pop operation), a request to obtain contents from a message stored on the message queue (i.e., a peek operation), a request to delete a message from the message queue (i.e., a delete operation), or a request to obtain a length of the message queue for a given fairness tag (i.e., a length operation).

In one example, when the message request includes a request to store a message to the message queue, the routing component may assign a hash identifier and a hash configuration version number to the message. The hash configuration version number (or epoch number) may correspond to a current configuration of the hash ring with the host groups, and the hash identifier and the hash configuration version number may be hashed to form a message identifier for the message. The hash identifier may identify a hash function, which may be keyed with the hash configuration version number (e.g., the hash function may be modified by the hash configuration version number). Based on the message identifier, the routing component may select a host group from the hash ring into which to store the message. The message may be stored to the host group selected from the hash ring. In addition, the message identifier associated with the message may be returned back to the client to enable additional interactions to be performed with the message.

Generally speaking, the hash ring may include a plurality of host groups, and messages stored on individual hash groups may be stored and/or accessed using the hash function (or hash identifier) in combination with the hash configuration version number. In other words, using known hashing techniques, the hash identifier (or hash function) may be used to determine a mapping between a specific message and an individual host group in the hash ring. Since the configuration of the hash ring may periodically change over a period of time, the hash configuration version number may be utilized in combination with the hash identifier.

In another example, the message may be retrieved from the hash ring in accordance with the message request. More specifically, based on the hash configuration version number (as indicated in the message identifier) and the hash identifier, the routing component may retrieve the message from one or more host groups in the hash ring corresponding to the hash configuration version number. The routing component may retrieve the message in accordance with a fairness scheme. For example, the routing component may utilize a round-robin technique when retrieving the message from the one or more host groups, such that a load caused by the retrieval of the message may be distributed fairly across the host groups in the hash ring.

In one configuration, the hash ring may be scaled up or scaled down based on traffic flow. For example, the hash ring may be scaled up or scaled down based on the number of messages that are stored in the hash ring. The hash ring may scale up when additional host groups are added to the hash ring. Similarly, the hash ring may scale down when host groups are removed from the hash ring. Each time the hash ring is scaled up or scaled down, the current hash configuration version number associated with the hash ring may be incremented (or decremented). The incremented hash configuration version number may be provided to a configuration table. The configuration table may list a plurality of hash configuration version numbers and corresponding host groups. In other words, for each hash configuration version number, the configuration table may list the active host groups.

In one example, the message may be deleted from the hash ring in accordance with the message request. Based on the hash identifier associated with the message and the hash configuration version number associated with the hash ring, as indicated in the message identifier, the routing component may locate the message in the hash ring and then delete the message from the hash ring. In a further example, contents of the message may be returned in accordance with the message request (e.g., a peek request). More specifically, based on the hash identifier and the hash configuration version number, as indicated in the message identifier, the contents of the message may be returned and the message may remain stored in the hash ring.

For the delete and peek requests, the hash identifier and the hash configuration version number may be used in conjunction with the configuration table. In other words, even when the hash ring has since been modified (e.g., scaled up and/or scaled down), the routing component may look up the hash configuration version number included in the message identifier in the configuration table, and an appropriate hash ring may be identified from the configuration table. The routing component may use the hash identifier to identify an appropriate host group from the hash ring, such that performance of the delete and peek requests may be achieved.

FIG. 1 illustrates an exemplary system and related operations for storing message to and retrieving messages from a hash ring 150 with a plurality of host groups in a service provider environment 100. For example, the hash ring 150 may include a first host group 152, a second host group 154, a third host group 156, and a fourth host group 158. Each host group may include one or more individual hosts. In one example, program code 110 or a client may send a message request to a load balancer 120. The message request may include requests to store messages on the hash ring 150, retrieve messages from the hash ring 150, delete messages from the hash ring 150, or obtain contents of messages stored on the hash ring 150. The load balancer 120 may forward the message request to a routing component 130.

As an example, when the message request is to store a message on the hash ring 150, the routing component 130 may assign a hash identifier and a hash configuration version number to the message, and the routing component 130 may use the hash identifier and the hash configuration version number to select a host group from the hash ring 150 to store the message. As another example, when the message request is to retrieve the message from the hash ring 150, the routing component may retrieve the message from the host groups in the hash ring 150 corresponding to the hash configuration version number assigned to the message. The message may be retrieved for consumption by the program code 110 or client.

As further examples, the routing component 130 may delete the message from the hash ring 150, or obtain contents of the message stored on the hash ring 150 using a configuration table 140. The configuration table 140 may be coupled to the routing component 130. The configuration table 140 may list a plurality of hash configuration version numbers and corresponding host groups. In other words, for each hash configuration version number, the configuration table 140 may list the active host groups. The routing component 130 may access the configuration table 140 to locate the message, and then delete the message or retrieve the contents of the message without deleting the message.

Figure 2:
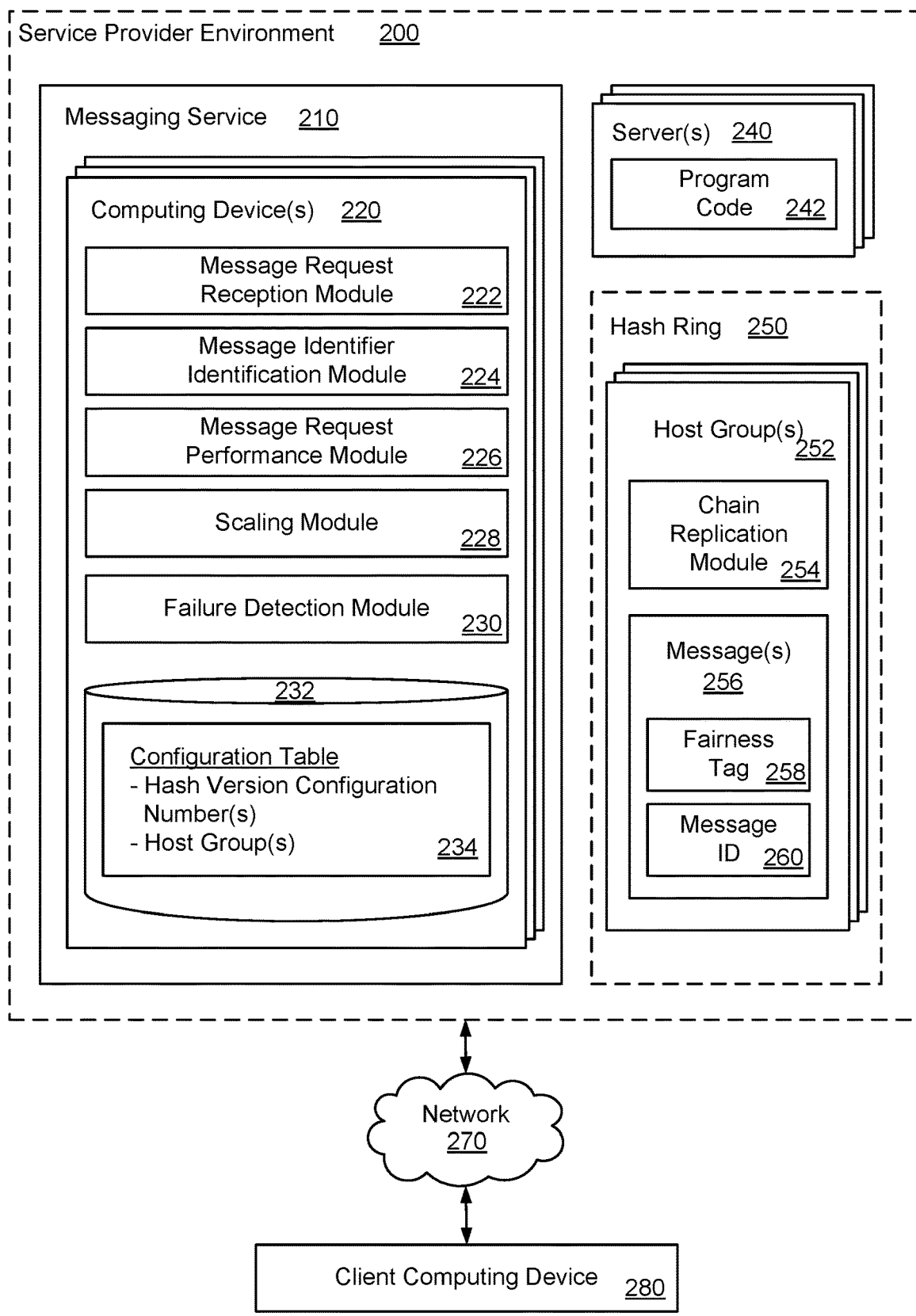
FIG. 2 is an illustration of a networked system for messaging according to an example of the present technology.

FIG. 2 illustrates components of an example service provider environment 200 according to one example of the present technology. The service provider environment 200 may include a messaging service 210, servers 240 that execute program code 242, and a hash ring 250 with a plurality of host groups 252. Each host group 252 may include one or more individual hosts. The messaging service 210 may operate one or more computing devices 220 and data store(s) 232 to store and retrieve messages 256 from the hash ring 250 with the host groups 252. The messages 256 may be associated with a fairness tag 258 and a message identifier 260. The messages 256 may be consumed by the program code 242 executing on the servers 240. In addition, the messaging service 210 may be in communication with a client computing device 280 via a network 270.

In one example, the data store 232 may include a configuration table 234. The configuration table 234 may list a plurality of hash configuration version numbers and corresponding host groups 252. In other words, for each hash configuration version number, the configuration table 234 may list the active host groups 252 in the hash ring 250. In addition, when the hash ring 250 is scaled up or scaled down (i.e., host groups 252 are added or removed from the hash ring 250), a new hash configuration version number may be assigned to the hash ring 250. The new hash configuration version number and corresponding host groups 252 may be stored in the configuration table 234.

As a non-limiting example, for a first hash configuration version number stored in the configuration table 234, the corresponding host groups 252 may be A, B and C. For a second hash configuration version number stored in the configuration table 234, the corresponding host groups 252 may be A, B, C, D and E. For a third hash configuration version number stored in the configuration table 234, the corresponding host groups 252 may be A, B, and E.

The computing device(s) 220 operated by the messaging service 210 may include a number of modules for storing and retrieving the messages 256 from the hash ring 250 with the host groups 252. The computing device(s) 220 may include a message request reception module 222, a message identifier identification module 224, a message request performance module 226, a scaling module 228, a failure detection module 230, and other applications, services, processes, systems, engines, or functionality not discussed in detail herein.

The message request reception module 222 may be configured to receive a message request from the program code 242. The message request may include a request to retrieve a message 256 from the hash ring 250 with the host groups 252 (i.e., a pop operation), a request to store a message onto the hash ring 250 with the host groups 252 (i.e., a push operation), a request to obtain contents from a message stored on the hash ring 250 with the host groups 252 (i.e., a peek operation), a request to delete a message from the hash ring 250 with the host groups 252 (i.e., a delete operation), or a request to obtain a length of the host group 252 with the host groups 252 for a given fairness tag (i.e., a length operation).

The message identifier identification module 224 may be configured to identify the message identifier 260 associated with the message request. For example, the message identifier 260 may correspond to a message 256 that is to be stored, retrieved or deleted from the hash ring 250, as indicated in the message request. The message identifier may include a hash identifier and a hash configuration version number. The hash identifier may be selected at random or selected from a subset of the host groups 252. The hash configuration version number may correspond to a configuration of the hash ring 250 with the host groups 252.

The message request performance module 226 may be configured to perform the message request with respect to the hash identifier and the hash configuration version number. In one example, the message request may be performed with respect to the hash identifier and the hash configuration version number based, in part, by accessing the configuration table 234 that lists the plurality of hash configuration version numbers and corresponding host groups 252. For example, the configuration table 234 may be accessed when retrieving messages 256 from the hash ring 250, deleting messages 256 from the hash ring 250, and obtaining contents of messages 256 stored in the hash ring 250.

In one example, the message request performance module 226 may store the message 256 on the hash ring 250 with the host groups 252. The message 256 may be associated with the fairness tag 258, and the fairness tag 258 may enable a selected host group 252 in the hash ring 250 to fairly distribute storage of the message 256 onto individual hosts within the host group 252. In another example, the message request performance module 226 may retrieve the message 256 from the hash ring 250. The message may be retrieved from the hash ring 250 that is associated with the hash configuration version number in the message identifier 260. In addition, the message request performance module 226 may retrieve the message 256 from one or more host groups 252 in the hash ring 250 in accordance with a fairness scheme (e.g., a round-robin scheme).

The scaling module 228 may be configured to scale up the hash ring 250 based on an increased traffic load. For example, the scaling module 228 may scale up the hash ring 250 by adding additional host groups 252 to the hash ring 250. Similarly, the scaling module 228 may be configured to scale down the hash ring 250 based on a decreased traffic load. For example, the scaling module 228 may scale down the hash ring 250 by removing host groups 252 to the hash ring 250. Each time the hash ring 250 is scaled up or scaled down, the hash configuration version number associated with the hash ring 250 may be incremented. The incremented hash configuration version number may be stored in the configuration table 234.

The failure detection module 230 may be configured to detect a failure in an individual host within a given host group 252. When the failure is detected, the failure detection module 230 may remove the individual host from the host group 252. A new host may be added to the host group 252 to replace the individual host with the failure. In addition, messages that were stored on the (now removed) host may be copied to the new host.

In one example, the host groups 252 may each include a chain replication module 254. The chain replication module 254 may function to store messages 256 on individual hosts using a chain replication protocol. In accordance with the chain replication protocol, individual hosts may be assigned a defined order, and messages 256 may be passed from a highest ordered host to a lowest ordered host until the messages 256 are replicated across each of the individual hosts in the host group 252.

The client computing device 280 may comprise a computer system that is embodied in the form of a desktop computer, a laptop computer, mobile devices, cellular telephones, smartphones, set-top boxes, network-enabled televisions, tablet computer systems, or other devices with like capability.

The various processes and/or other functionality contained within the service provider environment 200 may be executed on one or more processors that are in communication with one or more memory modules. The service provider environment 200 may include a number of computing devices that are arranged, for example, in one or more server banks or computer banks or other arrangements. The computing devices may support a computing environment using hypervisors, virtual machine managers (VMMs) and other virtualization software.

The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

The network 270 may include any useful computing network, including an intranet, the Internet, a localized network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
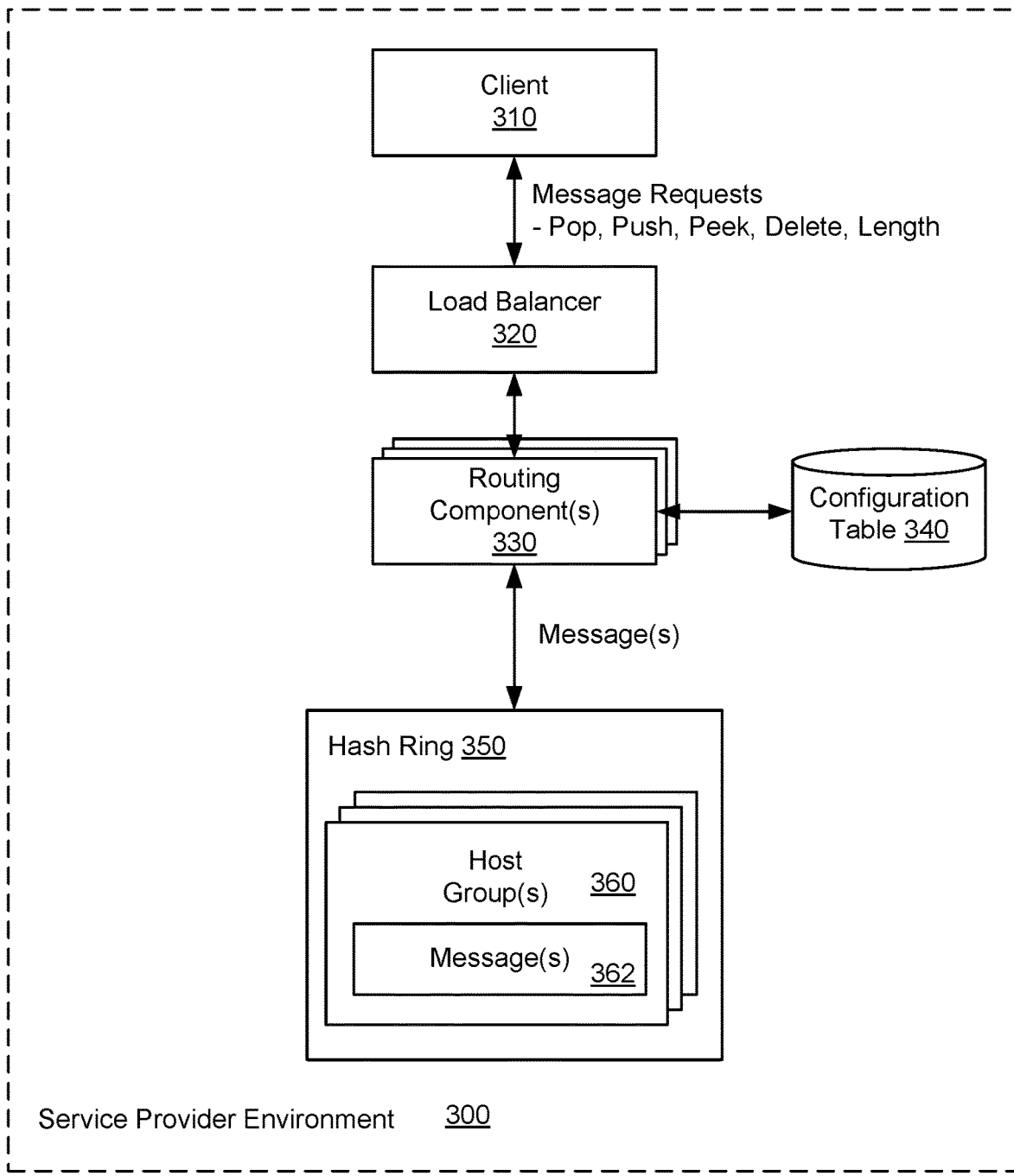
FIG. 3 illustrates a system and related operations for storing, retrieving and deleting messages from a hash ring with host groups according to an example of the present technology.

FIG. 3 illustrates an exemplary system and related operations for storing, retrieving and deleting messages 362 from a hash ring 350 with a plurality of host groups 360 in a service provider environment 300. Each host group 360 may include one or more individual hosts, and the individual hosts may be located in different geographic regions (or availability zones). The hosts may include physical hosts or virtualized hosts. The hash ring 350 may be a message queue that is capable of storing a plurality of messages. The hash ring 350 may function as a broker to support the communication of messages between clients 310 (e.g., applications, components, program codes, threads or processes) that are executing in the service provider environment 300. For example, a first client may store a message on the hash ring 350, and the message may be retrieved for consumption at a second client.

In one example, the hash ring 350 may function as a scalable, multi-tenant delay message queue. When messages are inserted into the hash ring 350, the messages may be hashed to one of a plurality of host groups 360. Each host group 360 in the hash ring 350 may be a multi-availability zone, fault-tolerant and in-memory priority message queue, and each host group 360 may support per-queue first-in first-out (FIFO) store and retrieve operations (or push and pop operations, respectively), as well as delete and modify operations. The hashing of the messages may provide scalability, and the host groups 360 may provide availability zone fault tolerance, durability and increased availability. In addition, the operations may be processed in a fair order, and requests from a customer to perform such operations may not starve other requests from the same customer or other customers.

In one example, the client 310 may send a message request to a load balancer 320. The message request may include a request to retrieve a message 362 from the hash ring 350 (i.e., a pop operation), a request to store a message 362 onto the hash ring 350 (i.e., a push operation), a request to obtain contents from a message 362 stored on the hash ring 350 (i.e., a peek operation), a request to delete a message 362 from the hash ring 350 (i.e., a delete operation), or a request to obtain a length of the host group 360 for a given fairness tag (i.e., a length operation). The message request may be received at the load balancer 320. The load balancer 320 may select an appropriate routing component 330 to forward the message request. Depending on the type of message request (e.g., pop, push, delete, peek or length), the routing component 330 may perform certain actions to fulfill the message request for the client 310.

In one example, the message request may be to store the message 362 (or push the message 362) onto the hash ring 350. In this example, the routing component 330 may assign a hash identifier and a hash configuration version number (or epoch number) to the message 362 to be stored on the hash ring 350. The hash identifier and the hash configuration version number may form a message identifier for the message 362. The hash identifier may correspond to a hash function. The hash configuration version number may correspond to a current configuration of the hash ring 350. As a default, the hash configuration version number that is assigned to the message 362 may automatically map to a latest version of the hash ring 350. The hash identifier may be selected at random, or may be selected from a subset of the host groups 360. Based on the hash identifier and the hash configuration version number included in the message identifier, the routing component 330 may select a particular host group 360 from the hash ring 350 on which to store the message 362, and the particular host group 360 may be selected using a stable hash function. In other words, the hash configuration version number may indicate a particular configuration of the hash ring 350 that is to store the message 362, and the hash identifier may indicate a particular host group 360 in that particular configuration of the hash ring 350 that is to store the message 362.

In one example, the message 362 may be stored to the host group 360 selected from the hash ring 350. The message 362 may be stored on the host group 360 with an optional time delay (e.g., in seconds). The time delay may be limited to a maximum value. The message 362 may remain on the selected host group 360 until the message 362 is removed (e.g., using a delete operation). In addition, the message identifier associated with the message 362 may be returned back to the client 310, as the message identifier (which includes the hash identifier and the hash configuration version number) assigned to the message 362 may be used to locate the selected host group 360 storing the message 362 for an entire lifetime of the message 362. In contrast to other hash-ring based databases, the hash ring 350 may not move messages between the host groups 360.

In one example, the message 362 may be stored on the host group 360 in accordance with a fairness tag included in the message request. The fairness tag may enable the host group 360 in the hash ring 350 to fairly distribute storage of the message 362 onto individual hosts within the host group 360. The host group 360 may implement a message sub-queue per fairness tag. Similar to the message queues, each message sub-queue may implement first-in first-out (FIFO) operations. The fairness tagging may be implemented at the host group 360, as opposed to being implemented at the routing component 330. In other words, the routing component 330 may provide messages 362 to the host group 360 included in the hash ring 350, and the host group 360 may fairly distribute the messages 362 for storage.

As an example, the host group 360 may implement message sub-queues A, B, and C, which may correspond to fairness tags A, B and C. When the message 362 includes fairness tag A, the host group 360 may store the message 362 onto message sub-queue A. Similarly, when the message 362 includes fairness tag B, the host group 360 may store the message 362 onto message sub-queue B. Therefore, the fairness tags enable the host group 360 to store the messages 360 on specific sub-queues within the host group 360.

In another example, the message request may be to retrieve the message 362 (or pop the message 362) from the hash ring 350. In this example, the routing component 330 may receive the message request, and the message request may include the message identifier associated with the message 362 to be retrieved from the hash ring 350. The routing component 330 may identify the hash configuration version number and the hash identifier from the message identifier. The routing component 330 may attempt to retrieve the message 362 from each host group 360 in the hash ring 350 associated with the hash configuration version number. For example, the routing component 330 may attempt to retrieve the message 362 from a first host group, a second host group, a third host group, etc. The routing component 330 may be notified when the message 362 is not stored in a particular host group 360, and the routing component 330 may move on to a next host group 360. The routing component 330 may attempt to retrieve the message 362 in one or more host groups 360 in the hash ring 350 associated with the hash configuration version number, and then the routing component 330 may attempt to retrieve the message 362 from hash rings associated with newer hash configuration version numbers (as compared to the hash ring 350).

The routing component 330 may attempt to retrieve the message 362 in accordance with a fairness scheme. For example, the routing component 330 may utilize a round-robin technique when retrieving the message 362 from the hash ring 350. The routing component 330 may select a next host group 360 in the hash ring 350 in a round-robin order, and then attempt to retrieve the message 362 from that host group 360. As a result, the routing component 330 can achieve approximate fairness (and k-ordering) by assuring that a pop load is distributed fairly across all the host groups 360 in the hash ring 350. In addition, the routing component 330 may retrieve the message 362 using the fairness tag, which may enable the message 362 to be retrieved from individual hosts within the host group 360 in a fair manner.

In addition, when the message 362 is retrieved from the hash ring 350, a copy of the message 362 may remain stored on the hash ring 350 (i.e., the message 362 may not be automatically deleted from the hash ring 350). Therefore, the message 362 may be subject to a visibility timeout, which may be a period of time during which other clients are prevented from receiving and processing that message 362.

In yet another example, the message request may be to delete the message 362 from the hash ring 350. In this example, the routing component 330 may identify the message identifier associated with the message 362, which may include the hash identifier and the hash configuration version number. The routing component 330 may look up the hash configuration version number in a configuration table 340. The configuration table 340 may list a plurality of hash configuration version numbers and corresponding host groups. In other words, for each hash configuration version number, the configuration table 340 may list the active host groups. The active host groups may change for each hash configuration version number, for example, due to scaling of the host groups in each configuration of the hash ring. The routing component 330 may identify an appropriate hash ring 350 from the configuration table 340. The hash ring 350 identified from the configuration table 340 may correspond to the hash ring on which the message 362 was originally stored. The routing component 330 may use the hash identifier to identify an appropriate host group 360 from the identified hash ring 350. After the appropriate host group 360 is identified from the hash ring 350, the routing component 330 may delete the message 362 from the host group 360. The routing component 330 may receive a confirmation (e.g., a Boolean value) after the message 362 has been deleted from the hash ring 350 (or when an attempt to delete the message 362 has failed).

In a further example, the message request may be to retrieve contents of the message 362 from the hash ring 350 (i.e., a peek operation). In this example, the routing component 330 may identify the message identifier associated with the message 362, which may include the hash identifier and the hash configuration version number. The routing component 330 may look up the hash configuration version number in the configuration table 340. The routing component 330 may identify an appropriate hash ring 350 from the configuration table 340. The routing component 330 may use the hash identifier to identify an appropriate host group 360 from the identified hash ring 350. After the appropriate host group 360 is identified from the hash ring 350, the routing component 330 may retrieve the contents of the message 362 from the host group 360. However, the routing component 330 may not change a position of the message 362 within the hash ring 350. Thus, the routing component 330 may retrieve the contents of the message 362, but without modifying or deleting the message 362 from the hash ring 350.

In an additional example, the message request may be for a length associated with the host group 360 for a given fairness tag. As previously described, the fairness tag may enable the host group 360 to fairly distribute storage of messages 362 onto individual hosts within the host group 360. In this example, the routing component 330 may obtain the length of the host group 360 for the given fairness tag, and the routing component 330 may return the length to the client 310.

Figure 4:
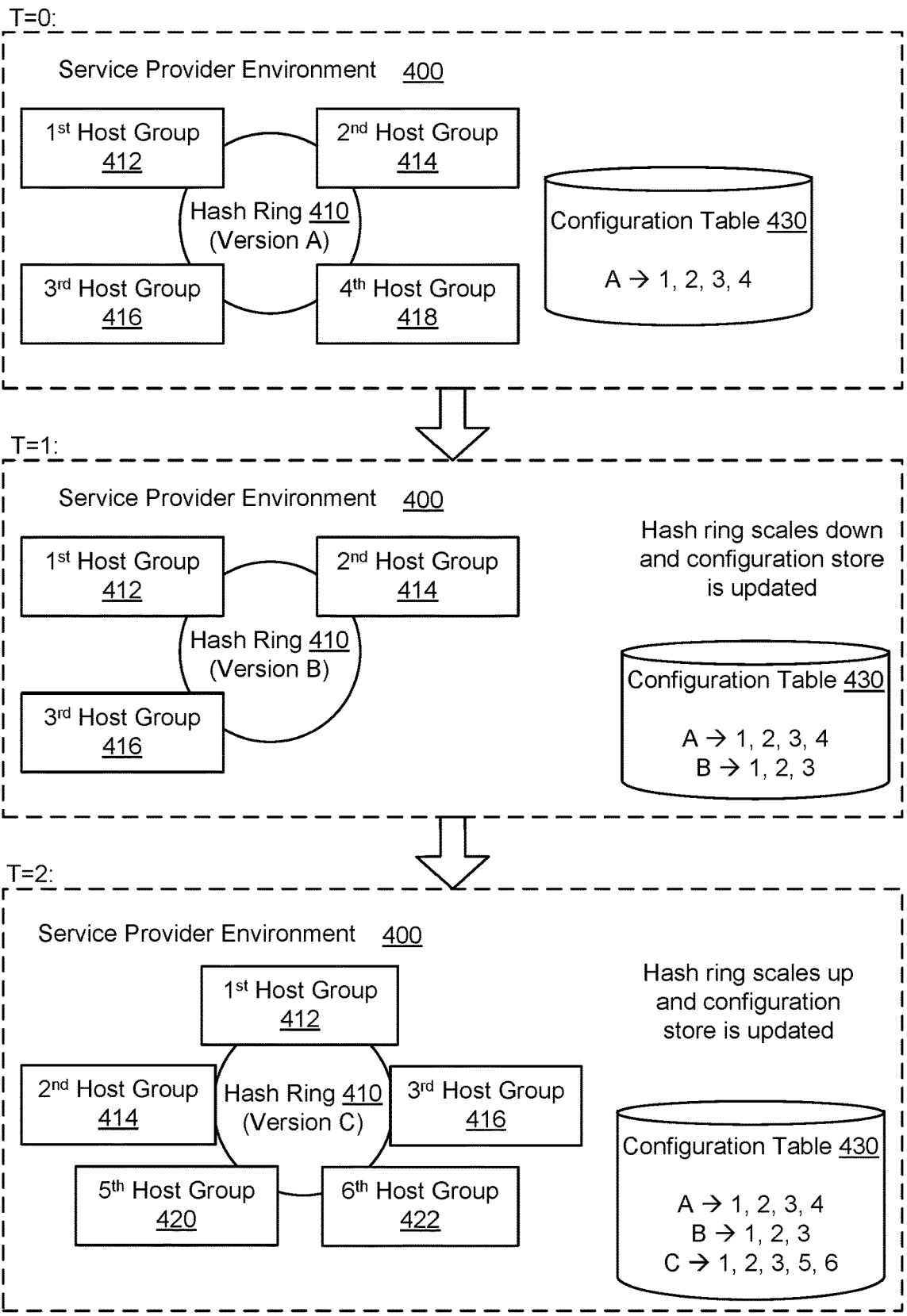
FIG. 4 illustrates scaling up and scaling down a hash ring with host groups according to an example of the present technology.

FIG. 4 illustrates an example of scaling up and scaling down a hash ring 410 over a defined period of time in a service provider environment 400. The hash ring 410 may include a plurality of host groups, and the hash ring 410 may communicate with a configuration table 430. The configuration table 430 may indicate active host groups for a given hash ring configuration number. The hash ring 410 may not be a static configuration. In other words, the specific host groups that are included in the hash ring 410 may change over time due to changes to the traffic flow.

In one example, at a first time instance (T=0), the hash ring 410 may include a first host group 412, a second host group 414, a third host group 416, and a fourth host group 418. The hash ring 410 may be associated with a hash ring configuration number (e.g., Version A). In addition, the configuration table 430 may include an entry for the hash ring configuration number (e.g., Version A), and that the active host groups for that hash ring configuration number are the four host groups 412, 414, 416, 418.

At a second time instance (T=1), a decrease in traffic flow may cause the hash ring 410 to scale down the number of host groups that are included in the hash ring 410. Now, for example, the hash ring 410 may include the first host group 412, the second host group 414, and the third host group 416. The fourth host group 418 may have been removed when the hash ring 410 is scaled down. In this example, the hash ring 410 may be associated with a new hash ring configuration number (e.g., Version B). In addition, the configuration table 430 may include an entry for the new hash ring configuration number (e.g., Version B), and that the active host groups for the new hash ring configuration number are the three host groups 412, 414, 416. The configuration table 430 may continue to store the entry for earlier hash ring configuration numbers (e.g., Version A).

At a third time instance (T=2), an increase in traffic flow may cause the hash ring 410 to scale up the number of host groups that are included in the hash ring 410. Now, for example, the hash ring 410 may include the first host group 412, the second host group 414, the third host group 416, a fifth host group 420, and a sixth host group 422. In this example, the hash ring 410 may be associated with a new hash ring configuration number (e.g., Version C). In addition, the configuration table 430 may include an entry for the new hash ring configuration number (e.g., Version C), and that the active host groups for the new hash ring configuration number are the five host groups 412, 414, 416, 420, 422. The configuration table 430 may continue to store the entry for earlier hash ring configuration numbers (e.g., Versions A and B).

In one example, when the hash ring 410 is updated and the hash ring configuration number is incremented, routing components handing push traffic may begin to use the incremented hash ring configuration number. In other words, the routing components may begin storing messages on the updated hash ring 410. The routing component may cache its view of the hash ring configuration for a defined period of time (as limited by a post-drain safety time). When the routing component is requested to fulfill a message request, but the routing component does not have a cached view of the hash ring configuration, the routing component may reject the message request or update its view of the hash ring configuration.

In one example, when the hash ring 410 scales down and a particular host group (e.g., the fourth host group 418) is removed, the host group may be completely drained before it can be removed (i.e., no more messages may be stored on the host group). After all the messages have been removed from the host group, the hash ring 410 may wait an additional post-drain safety time (which may be greater than a maximum time for which the routing component caches the hash ring configuration). Then, the hash ring 410 may safely decommission the host group (e.g., the fourth host group 418) without loss of data or messages.

Figure 5:
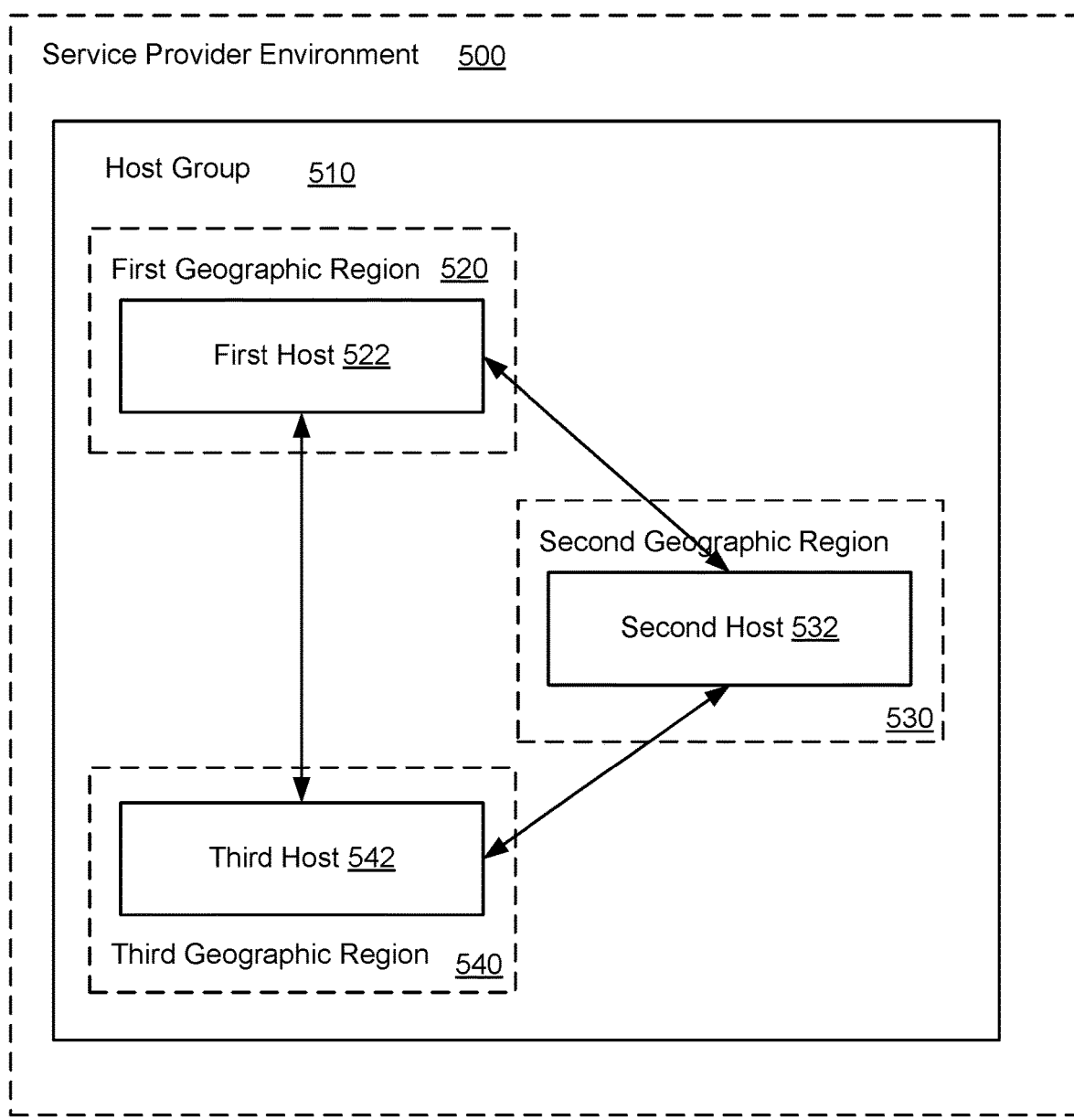
FIG. 5 illustrates a host group that includes a plurality of hosts in different geographic regions according to an example of the present technology.

FIG. 5 illustrates an example of a host group 510 that includes a plurality of hosts in different geographic regions in a service provider environment 500. The host group 510 may be a fault tolerant, in-memory, replicated message queue. The host group 510 may be included in a hash ring that includes a plurality of host groups (not shown). In this example, the host group 510 may include a first host 522 in a first geographic region 520, a second host 532 in a second geographic region 530, and a third host 542 in a third geographic region 540. The first, second and third geographic regions 520, 530, 540 may correspond to different availability zones.

In one example, messages may be replicated between the first, second and third hosts 522, 532, 542 to increase robustness and durability. The messages may be replicated using a chain replication protocol. For example, the first host 522 may be considered as a head of the host group 510, and the third host 542 may be considered as a tail of the host group 510. The messages may first be stored on the first host 522 (or head), and the message may be replicated through each host until the message is replicated to the third host 542 (or tail). For example, messages may be replicated from the first host 522 to the second host 532, and the messages may be replicated from the second host 532 to the third host 542.

In one example, the host group 510 may continue to function even when certain hosts in the host group 510 have experienced a failure and are unavailable. For example, the host group 510 may continue to function when at least two hosts are available, but the host group 510 may be non-functional when two hosts are unavailable. Therefore, the host group 510 may tolerate a certain degree of availability zone or host failure. In addition, the failure of a single host or an entire geographic region (or availability zone) may not necessitate a reconfiguration of the hash ring with the host groups.

Figure 6:
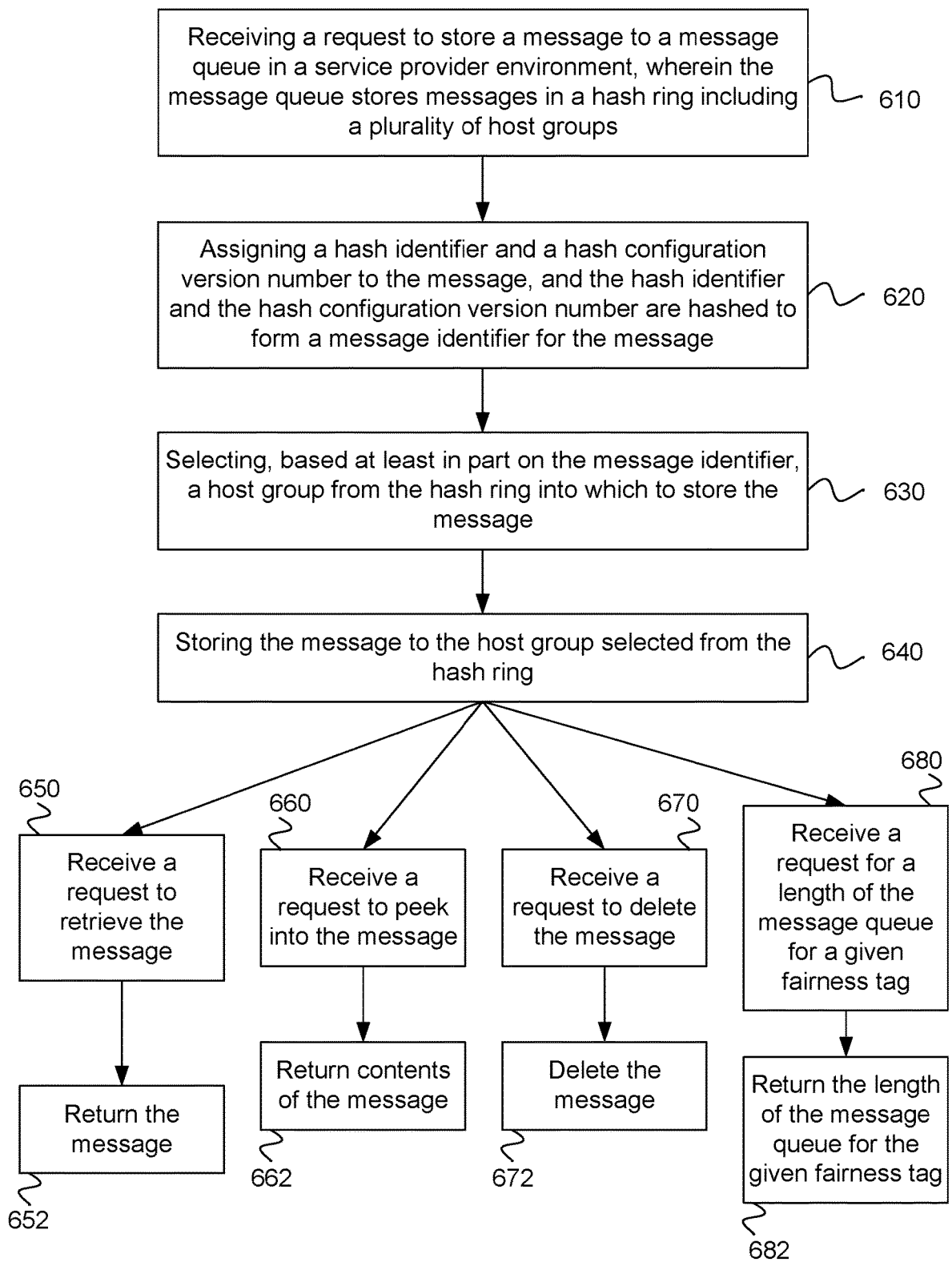
FIG. 6 is a flowchart of an example method for interacting with messages in a message queue.

FIG. 6 illustrates an example of a method for interacting with messages in a message queue. A request may be received, at a routing component from a client, to store a message to a message queue in a service provider environment, as in block 610. The message queue may store messages in a hash ring including a plurality of host groups. A host group in the hash ring may include one or more individual hosts.

A hash identifier and a hash configuration version number may be assigned to the message, as in block 620. The hash configuration version number may correspond to a current configuration of the hash ring with the host groups. The hash identifier and the hash configuration version number may be hashed to form a message identifier for the message. In one example, the hash configuration version number may be stored in a configuration table. The configuration table may list a plurality of hash configuration version numbers and corresponding host groups, and the configuration table may be accessed to perform requests with respect to the hash ring with the host groups corresponding to the hash configuration version number A host group may be selected from the hash ring into which to store the message, and the host group may be selected using the message identifier, as in block 630. More specifically, the host group may be selected using the hash identifier and the hash configuration version number included in the message identifier.

The message may be stored to the host group selected from the hash ring, as in block 640. The message identifier associated with the message may be returned back to the client to enable additional interactions to be performed with the message. In one example, the message may be stored to the host group in accordance with a fairness tag associated with the message. The fairness tag may enable the host group to fairly distribute storage of the message onto individual hosts within the host group.

In one example, a request may be received to retrieve the message, as in block 650, and the message may be returned, as in block 652. In another example, a request may be received to peek into the message, as in block 660, and contents of the message may be returned, as in block 662. In yet another example, a request may be received to delete the message, as in block 670, and the message may be deleted, as in block 672. In a further example, a request may be received for a length of the message queue for a given fairness tag, as in block 680, and the length of the message queue for the given fairness tag may be returned, as in block 682.

In one example, a second request may be received from the client to retrieve the message from the hash ring with the host groups, and the second request may include the message identifier associated with the message. The message that is associated with the hash configuration version number in the message identifier may be retrieved from the hash ring. The message may be attempted to be retrieved from each host group in the hash ring in accordance with a fairness scheme. The message may be attempted to be retrieved from updated hash rings with the host groups that are associated with incremented hash configuration version numbers. The updated hash rings with the host groups may be scaled up or scaled down in comparison to the hash ring with the host groups.

In one example, a third request may be received from the client to delete the message from the hash ring with the host groups, and the third request may include the message identifier associated with the message. The hash configuration version number associated with the hash ring with the host groups may be identified from the message identifier. The hash identifier associated with the message may be identified from the message identifier. The message may be deleted from the hash ring with the host groups based on the hash configuration version number and the hash identifier.

In one example, the hash ring with the host groups may be scaled up or scaled down to create an updated hash ring. Additional host groups may be added or removed when the hash ring is scaled up or scaled down, respectively. The hash configuration version number may be incremented when the hash ring is scaled up or scaled down, and an incremented hash configuration version number may be provided to a configuration table. Subsequent requests to store messages may be implemented using the updated hash ring with the host groups.

In one example, the hash configuration version number in the configuration table may be incremented when the hash ring with the host groups is recreated or duplicated in a different order without adding or removing host groups. In other words, the hash ring may be rehashed in the different order without adding or removing host groups, which may be useful in mitigating hotspots (i.e., congested regions). By periodically rehashing the hash ring, the storage of messages may be redistributed across the hash ring (which may be useful for load balancing).

Figure 7:
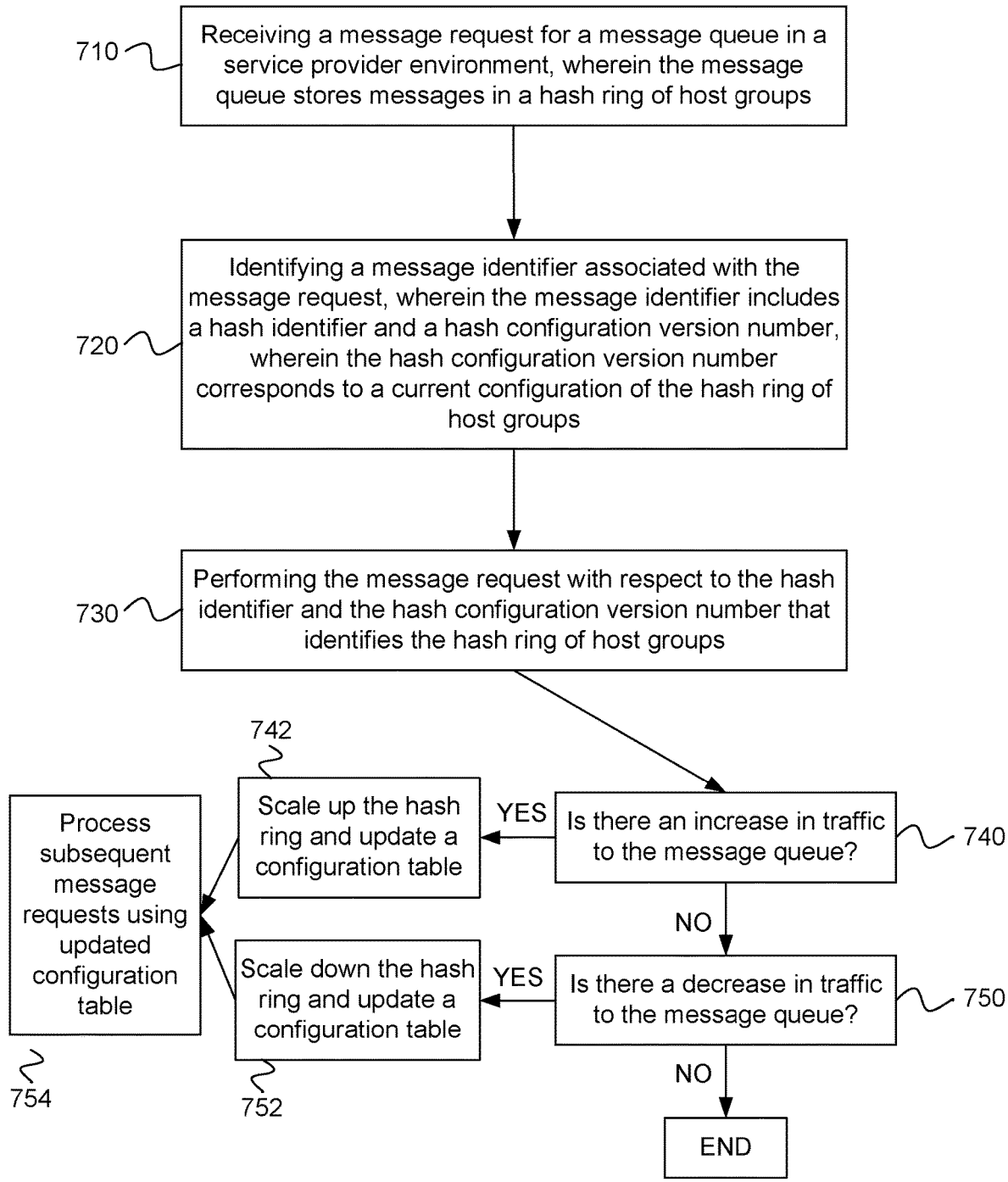
FIG. 7 is a flowchart of another example method for interacting with messages in a message queue.

FIG. 7 illustrates an example of a method for interacting with messages in a message queue. A message request may be received for a message queue in a service provider environment, as in block 710. The message queue may store messages in a hash ring of host groups, and a host group in the hash ring may include one or more individual hosts. The message request may include a request to retrieve a message from the message queue (i.e., a pop operation), a request to store a message onto the message queue (i.e., a push operation), a request to obtain contents from a message stored on the message queue (i.e., a peek operation), a request to delete a message from the message queue (i.e., a delete operation), or a request to obtain a length of the message queue for a given fairness tag (i.e., a length operation)

A message identifier associated with the message request may be identified, as in block 720. The message identifier may include a hash identifier and a hash configuration version number, and the hash configuration version number may correspond to a current configuration of the hash ring of host groups.

The message request may be performed with respect to the hash identifier and the hash configuration version number that identifies the hash ring of host groups, as in block 730. In one example, the message request may be performed with respect to the hash identifier and the hash configuration version number based, in part, by accessing a configuration table that lists a plurality of hash configuration version numbers and corresponding host groups. The configuration table may be accessed when performing the message request (e.g., the pop operation, push operation, peek operation, delete operation or length operation).

In one example, an increase in traffic to the message queue may be detected, as in block 740, and the hash ring may be scaled up and a configuration table may be updated, as in block 742. In another example, a decrease in traffic to the message queue may be detected, as in block 750, and the hash ring may be scaled down and the configuration table may be updated, as in block 752. When the hash ring is scaled up or down and the configuration table is updated, subsequent message requests may be processed using multiple versions of the configuration table, as in block 754.

In one example, the message request may include a request to store a message to the message queue. The message request may include a time delay parameter and a fairness tag. The fairness tag may enable a host group in the hash ring of host groups to fairly distribute storage of the message onto individual hosts within the host group.

In one example, the message request may include a request to retrieve a message from the message queue. The message may be retrieved from the hash ring of host groups that is associated with the hash configuration version number in the message identifier. The message may be attempted to be retrieved from each host group in the hash ring of host groups in accordance with a fairness scheme.

In one example, the message request may include a request to delete a message from the message queue. The message may be deleted from the hash ring of host groups based on the hash configuration version number and the hash identifier included in the message request.

In one example, the message request may include a request to peek into a message stored in the message queue. Contents of the message may be identified using the message identifier, and the contents of the message may be returned without modifying a position of the message in the message queue.

In one configuration, the message request may include a request for a length associated with the message queue. The length of the message queue may be determined for a given fairness tag, and the fairness tag may enable a host group in the hash ring of host groups to fairly distribute storage of the message onto individual hosts within the host group.

In one configuration, the message request may be received from program code that is executing on a host in the service provider environment. The message request may be received at a load balancer and provided to a selected routing component in the service provider environment, and the selected routing component may perform the message request using the hash ring of host groups indicated in the configuration table.

In one configuration, each host group may be configured to store messages on individual hosts using a chain replication protocol. The individual hosts may be assigned a defined order, and messages may be passed from a highest ordered host to a lowest ordered host until the messages are replicated across each of the individual hosts in the host group.

In one example, a failure may be detected in an individual host within a given host group. The individual host may be removed from the host group and a new host may be added to the host group. Messages stored in the host group may be copied to the new host.

Figure 8:
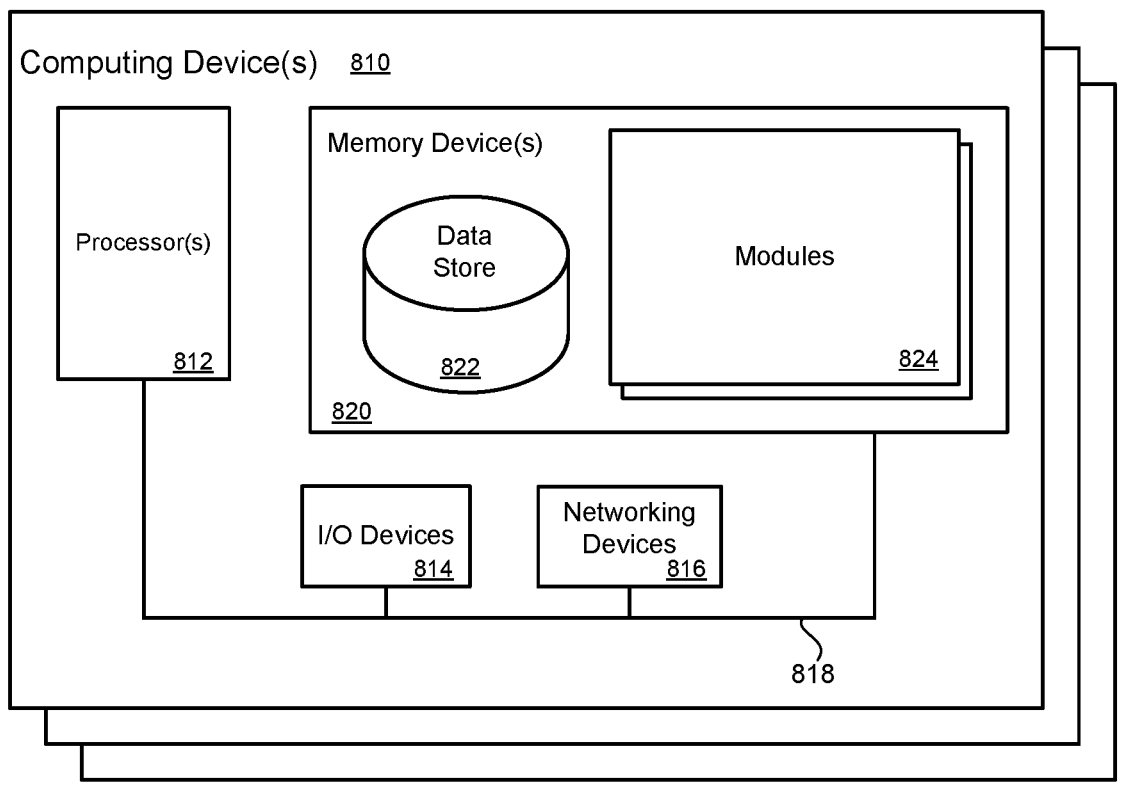
FIG. 8 is a block diagram that provides an example illustration of a computing device that may be employed in the present technology.

FIG. 8 illustrates a computing device 810 on which modules of this technology may execute. A computing device 810 is illustrated on which a high level example of the technology may be executed. The computing device 810 may include one or more processors 812 that are in communication with memory devices 820. The computing device may include a local communication interface 818 for the components in the computing device. For example, the local communication interface may be a local data bus and/or any related address or control busses as may be desired.

The memory device 820 may contain modules 824 that are executable by the processor(s) 812 and data for the modules 824. The modules 824 may execute the functions described earlier. A data store 822 may also be located in the memory device 820 for storing data related to the modules 824 and other applications along with an operating system that is executable by the processor(s) 812.

Other applications may also be stored in the memory device 820 and may be executable by the processor(s) 812. Components or modules discussed in this description that may be implemented in the form of software using high programming level languages that are compiled, interpreted or executed using a hybrid of the methods.

The computing device may also have access to I/O (input/output) devices 814 that are usable by the computing devices. An example of an I/O device is a display screen that is available to display output from the computing devices.

Other known I/O device may be used with the computing device as desired. Networking devices 816 and similar communication devices may be included in the computing device. The networking devices 816 may be wired or wireless networking devices that connect to the internet, a LAN, WAN, or other computing network.

The components or modules that are shown as being stored in the memory device 820 may be executed by the processor 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor. The executable program may be stored in any portion or component of the memory device 820. For example, the memory device 820 may be random access memory (RAM), read only memory (ROM), flash memory, a solid state drive, memory card, a hard drive, optical disk, floppy disk, magnetic tape, or any other memory components.

The processor 812 may represent multiple processors and the memory 820 may represent multiple memory units that operate in parallel to the processing circuits. This may provide parallel processing channels for the processes and data in the system. The local interface 818 may be used as a network to facilitate communication between any of the multiple processors and multiple memories. The local interface 818 may use additional systems designed for coordinating communication such as load balancing, bulk data transfer, and similar systems.

Figure 9:
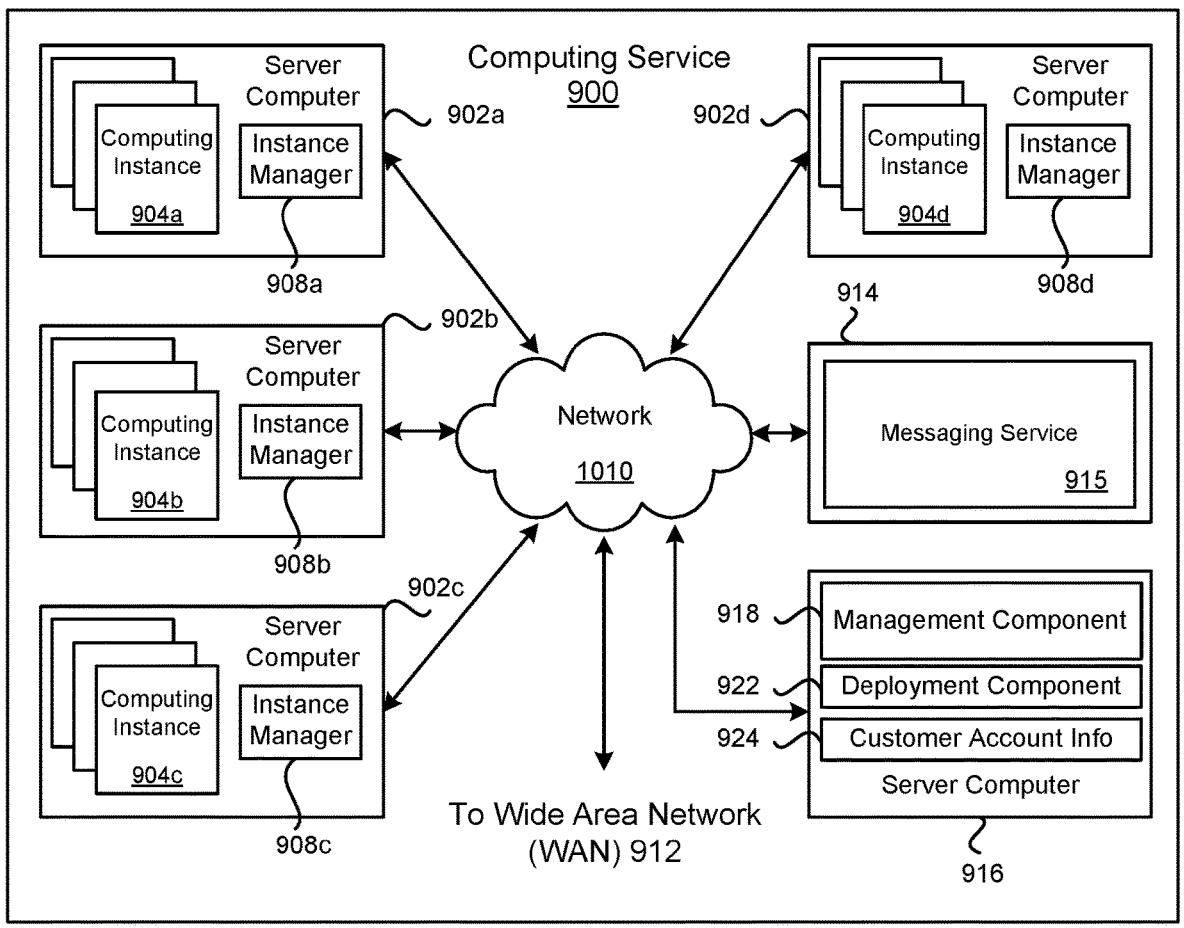
FIG. 9 is a block diagram of a service provider environment according to an example of the present technology.

FIG. 9 is a block diagram illustrating an example computing service 900 that may be used to execute and manage a number of computing instances 904a-d upon which the present technology may execute. In particular, the computing service 900 depicted illustrates one environment in which the technology described herein may be used. The computing service 900 may be one type of environment that includes various virtualized service resources that may be used, for instance, to host computing instances 904a-d.

The computing service 900 may be capable of delivery of computing, storage and networking capacity as a software service to a community of end recipients. In one example, the computing service 900 may be established for an organization by or on behalf of the organization. That is, the computing service 900 may offer a "private cloud environment." In another example, the computing service 900 may support a multi-tenant environment, wherein a plurality of customers may operate independently (i.e., a public cloud environment). Generally speaking, the computing service 900 may provide the following models: Infrastructure as a Service ("IaaS"), Platform as a Service ("PaaS"), and/or Software as a Service ("SaaS"). Other models may be provided. For the IaaS model, the computing service 900 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 900. End customers may access the computing service 900 using networked client devices, such as desktop computers, laptops, tablets, smartphones, etc. running web browsers or other lightweight client applications, for example. Those familiar with the art will recognize that the computing service 900 may be described as a "cloud" environment.

The particularly illustrated computing service 900 may include a plurality of server computers 902a-d. The server computers 902a-d may also be known as physical hosts. While four server computers are shown, any number may be used, and large data centers may include thousands of server computers. The computing service 900 may provide computing resources for executing computing instances 904a-d. Computing instances 904a-d may, for example, be virtual machines. A virtual machine may be an instance of a software implementation of a machine (i.e. a computer) that executes applications like a physical machine. In the example of a virtual machine, each of the server computers 902a-d may be configured to execute an instance manager 908a-d capable of executing the instances. The instance manager 908a-d may be a hypervisor, virtual machine manager (VMM), or another type of program configured to enable the execution of multiple computing instances 904a-d on a single server. Additionally, each of the computing instances 904a-d may be configured to execute one or more applications.

A server 914 may be reserved to execute software components for implementing the present technology or managing the operation of the computing service 900 and the computing instances 904a-d. For example, the server computer 914 may execute a messaging service 915 that maintains a message queue. The messaging service 915 may receive a message request for the message queue, and the message queue may store messages in a hash ring of host groups, and a host group in the hash ring may include one or more individual hosts. The messaging service 915 may identify a message identifier associated with the message request. The message identifier may include a hash identifier and a hash configuration version number, and the hash configuration version number may correspond to a current configuration of the hash ring of host groups. The messaging service 915 may perform the message request with respect to the hash identifier and the hash configuration version number that identifies the hash ring of host groups.

A server computer 916 may execute a management component 918. A customer may access the management component 918 to configure various aspects of the operation of the computing instances 904a-d purchased by a customer. For example, the customer may setup computing instances 904a-d and make changes to the configuration of the computing instances 904a-d.

A deployment component 922 may be used to assist customers in the deployment of computing instances 904a-d. The deployment component 922 may have access to account information associated with the computing instances 904a-d, such as the name of an owner of the account, credit card information, country of the owner, etc. The deployment component 922 may receive a configuration from a customer that includes data describing how computing instances 904a-d may be configured. For example, the configuration may include an operating system, provide one or more applications to be installed in computing instances 904a-d, provide scripts and/or other types of code to be executed for configuring computing instances 904a-d, provide cache logic specifying how an application cache is to be prepared, and other types of information. The deployment component 922 may utilize the customer-provided configuration and cache logic to configure, prime, and launch computing instances 904*a-d*. The configuration, cache logic, and other information may be specified by a customer accessing the management component 918 or by providing this information directly to the deployment component 922.

Customer account information 924 may include any desired information associated with a customer of the multi-tenant environment. For example, the customer account information may include a unique identifier for a customer, a customer address, billing information, licensing information, customization parameters for launching instances, scheduling information, etc. As described above, the customer account information 924 may also include security information used in encryption of asynchronous responses to API requests. By "asynchronous" it is meant that the API response may be made at any time after the initial request and with a different network connection.

A network 910 may be utilized to interconnect the computing service 900 and the server computers 902*a-d*, 916. The network 910 may be a local area network (LAN) and may be connected to a Wide Area Network (WAN) 912 or the Internet, so that end customers may access the computing service 900. In addition, the network 910 may include a virtual network overlaid on the physical network to provide communications between the servers 902*a-d*. The network topology illustrated in FIG. 9 has been simplified, as many more networks and networking devices may be utilized to interconnect the various computing systems disclosed herein.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A method for interacting with messages in a message queue, the method comprising:
   receiving a request to store a message to a message queue in a service provider environment, wherein the message queue stores messages in a hash ring including a plurality of host groups, wherein a host group in the hash ring includes one or more individual hosts;
   assigning a hash identifier and a hash configuration version number to the message, wherein the hash configuration version number corresponds to a current configuration of the hash ring with the host groups, and the hash identifier and the hash configuration version number are hashed to form a message identifier for the message;
   storing the hash configuration version number in a configuration table, wherein the configuration table lists a plurality of hash configuration version numbers and corresponding host groups, and the configuration table is accessed to perform requests with respect to the hash ring with the host groups corresponding to the hash configuration version number;
   selecting, based at least in part on the message identifier, a host group from the hash ring into which to store the message; and
   storing the message to the host group selected from the hash ring, wherein the message identifier associated with the message is returned back to a client.

2. The method of claim 1, further comprising storing the message to the host group in accordance with a fairness scheme in which the host group fairly distributes storage of the message onto individual hosts within the host group.

3. The method of claim 1, further comprising:
   receiving a second request to retrieve the message from the hash ring with the host groups, wherein the second request includes the message identifier associated with the message; and
   retrieving the message from the hash ring that is associated with the hash configuration version number in the message identifier, wherein the message is attempted to be retrieved from the host group in the hash ring in accordance with a fairness scheme.

4. The method of claim 1, further comprising:
   receiving a third request to delete the message from the hash ring with the host groups, wherein the third request includes the message identifier associated with the message;
   identifying, from the message identifier, the hash configuration version number associated with the hash ring with the host groups;
   identifying, from the message identifier, the hash identifier associated with the message; and
   deleting the message from the host groups in the hash ring based on the hash configuration version number and the hash identifier.

5. The method of claim 1, further comprising:
   scaling the hash ring with the host groups to create an updated hash ring, wherein additional host groups are added or removed when the hash ring is scaled;
   incrementing the hash configuration version number in the configuration table when the hash ring is scaled; and
   providing an incremented hash configuration version number to the configuration table, wherein subsequent requests to store messages are implemented using the updated hash ring with the host groups.

6. A method for interacting with messages in a message queue, the method comprising:
   receiving a message request for a message queue in a service provider environment, wherein the message queue stores messages in a hash ring of host groups, and a host group in the hash ring includes one or more individual hosts;
   identifying a message identifier associated with the message request, wherein the message identifier includes a hash identifier and a hash configuration version number, and the hash configuration version number corresponds to a current configuration of the hash ring of host groups; and
   performing the message request using the hash identifier and the hash configuration version number that identifies the hash ring of host groups based, in part, by accessing a configuration table that lists a plurality of hash configuration version numbers and corresponding host groups.

7. The method of claim 6, wherein the message request includes a request to store a message to the message queue, and the message request includes a time delay parameter and a fairness tag, wherein the fairness tag enables a host group in the hash ring of host groups to fairly distribute storage of the message onto the one or more individual hosts within the host group.

8. The method of claim 6, wherein the message request includes a request to retrieve a message from the message queue, and the message is retrieved from the hash ring of host groups that is associated with the hash configuration version number in the message identifier, wherein the message is retrieved from each host group in the hash ring of host groups in accordance with a fairness scheme.

9. The method of claim 6, wherein the message request includes a request to delete a message from the message queue, wherein the message is deleted from the hash ring of host groups based on the hash configuration version number and the hash identifier included in the message request.

10. The method of claim 6, wherein the message request includes a request to peek into a message stored in the message queue, wherein contents of the message are identified using the message identifier, and the contents of the message are returned without modifying a position of a message in the message queue.

11. The method of claim 6, wherein the message request includes a request for a length associated with the message queue, and the length of the message queue is determined for a fairness tag, wherein the fairness tag enables a host group in the hash ring of host groups to fairly distribute storage of the message onto individual hosts within the host group.

12. The method of claim 6, wherein the message request is received from program code that is executing on a host in the service provider environment, and the message request is received at a load balancer.

13. The method of claim 6, wherein each host group is configured to store messages on individual hosts using a chain replication protocol, wherein the individual hosts are assigned a defined order, and messages are passed from a highest ordered host to a lowest ordered host until the messages are replicated across each of the individual hosts in the host group.

14. The method of claim 6, further comprising incrementing the hash configuration version number in the configuration table when the hash ring with the host groups is recreated in a different order without adding or removing host groups.

15. The method of claim 6, further comprising detecting a failure in an individual host within a given host group, wherein the individual host is removed from the host group and a new host is added to the host group, wherein messages stored in the host group are copied to the new host.

16. A system for interacting with messages in a message queue, the system comprising:
- at least one processor;
- at least one memory device including a plurality of data and instructions that, when executed, cause the system to:
- receive a request to store a message to a message queue in a service provider environment, wherein the message queue stores messages in a plurality of host groups, wherein individual host groups are identified by a hash identifier and a hash configuration version number;
- assign the hash identifier and the hash configuration version number to the message, wherein the hash configuration version number corresponds to a current configuration of the host groups;
- select a host group from the hash ring into which to store the message based on the hash identifier and the hash configuration version number based, in part, by accessing a configuration table that lists a plurality of hash configuration version numbers and corresponding host groups; and
- store the message to the host group selected from the hash ring.

17. The system of claim 16, wherein the plurality of data and instructions, when executed, cause the system to store the message to the host group in accordance with a fairness tag associated with the message, wherein the fairness tag enables the host group to fairly distribute storage of the message onto individual hosts within the host group.

18. The system of claim 16, wherein the plurality of data and instructions, when executed, cause the system to store the hash configuration version number in a configuration table, wherein the configuration table lists a plurality of hash configuration version numbers and corresponding host groups, and the configuration table is accessed to perform requests with respect to the host groups corresponding to the hash configuration version number.

19. The system of claim 16, wherein the plurality of data and instructions, when executed, cause the system to scale the host groups, wherein host groups are added or removed when the hash ring is scaled, wherein the hash configuration version number is incremented during scaling, and an incremented hash configuration version number is provided to a configuration table.

* * * * *